US010174793B2

(12) United States Patent
Thomas et al.

(10) Patent No.: US 10,174,793 B2
(45) Date of Patent: Jan. 8, 2019

(54) TRIPOT CONSTANT VELOCITY JOINT

(71) Applicant: STEERING SOLUTIONS IP HOLDING CORPORATION, Saginaw, MI (US)

(72) Inventors: Steven M. Thomas, Saginaw, MI (US); William P. Skvarla, Saginaw, MI (US); Eduardo R. Mondragon-Parra, Freeland, MI (US); Jeffrey P. Courville, Frankenmuth, MI (US); Jon N. Miller, Merrill, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 55 days.

(21) Appl. No.: 14/878,611

(22) Filed: Oct. 8, 2015

(65) Prior Publication Data
US 2016/0123403 A1    May 5, 2016

Related U.S. Application Data

(60) Provisional application No. 62/072,757, filed on Oct. 30, 2014.

(51) Int. Cl.
*F16D 3/205* (2006.01)

(52) U.S. Cl.
CPC ......... *F16D 3/2055* (2013.01); *Y10S 464/905* (2013.01)

(58) Field of Classification Search
CPC ........................... F16D 3/2055; Y10S 464/905
USPC ....................................................... 464/111
See application file for complete search history.

(56) References Cited

U.S. PATENT DOCUMENTS

| 7,544,131 | B2 | 6/2009 | Ando et al. |
| 8,029,372 | B2 | 10/2011 | Ando et al. |
| 8,353,777 | B2 | 1/2013 | Mondragon-Parra et al. |
| 2002/0055389 | A1 | 5/2002 | Mizukoshi et al. |
| 2003/0232654 | A1 | 12/2003 | Perrow |

(Continued)

FOREIGN PATENT DOCUMENTS

| JP | 2004332816 A | 11/2004 |
| JP | 2005054835 A | 3/2005 |

(Continued)

OTHER PUBLICATIONS

Alfeld, P., Why Can't We Divide by Zero, Understanding Mathematics [online], The University of Utah, Feb. 17, 1997, [Retrieved on Nov. 7, 2017]. Retrieved from the Internet: https://www.math.utah.edu/~pa/math/0by0.html>.*

(Continued)

*Primary Examiner* — Greg Binda
(74) *Attorney, Agent, or Firm* — Cantor Colburn LLP

(57) ABSTRACT

A tripot constant velocity joint includes a housing defining a guide channel. A spider member is received within the housing and includes a trunnion having a functional outer surface with a convex profile defined by a first principal radius of curvature and a second principal radius of curvature different from the first principal radius of curvature. A first inner surface of a first ball member engages the functional outer surface of the trunnion. A first outer surface of the first ball member is provided with a non-symmetric piecewise continuous profile that engages the first sidewall.

16 Claims, 7 Drawing Sheets

(56) References Cited

U.S. PATENT DOCUMENTS

| | | |
|---|---|---|
| 2009/0011843 A1 | 1/2009 | Oh et al. |
| 2009/0197687 A1 | 8/2009 | Ando et al. |
| 2009/0305793 A1* | 12/2009 | Bongartz .............. F16D 3/2055 |
| 2011/0053695 A1* | 3/2011 | Yun ....................... F16D 3/2055 |

FOREIGN PATENT DOCUMENTS

| | | |
|---|---|---|
| JP | 2006283828 A | 10/2006 |
| WO | 0231373 A2 | 4/2002 |
| WO | 0233276 A2 | 4/2002 |
| WO | 2007132963 A1 | 11/2007 |

OTHER PUBLICATIONS

Korean Office Action for application No. KR 10-2015-0151670 dated Mar. 15, 2017, english translation included.
Extended European search report for related European application No. 15191673.1, dated Jun. 23, 2016, pp. 10.

* cited by examiner

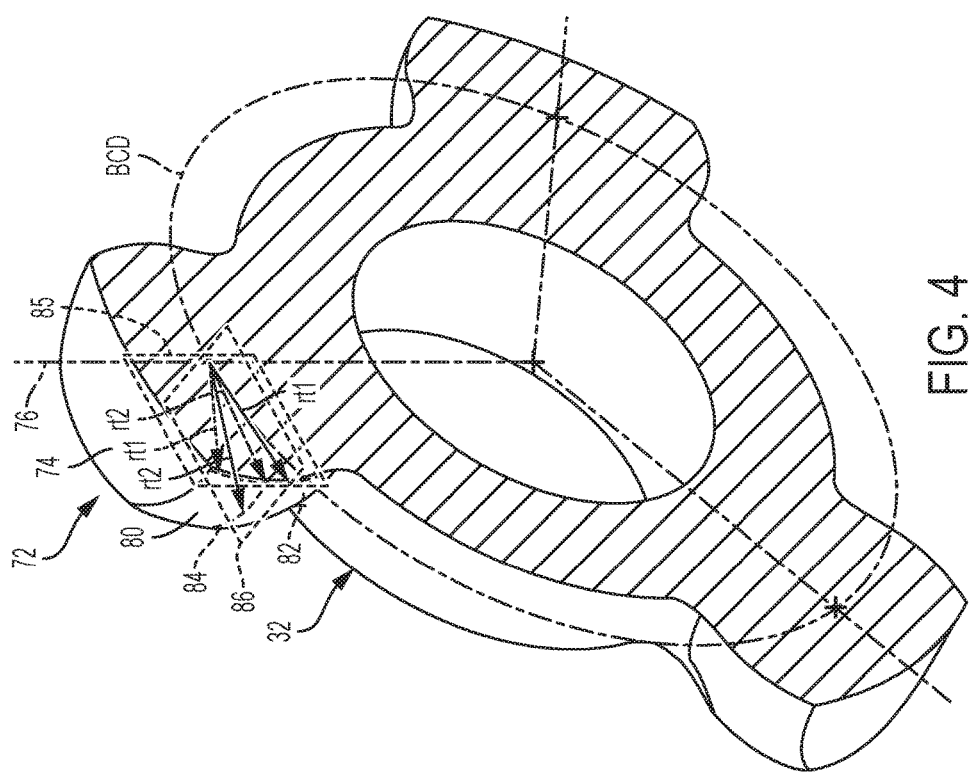

TRIPOT CONSTANT VELOCITY JOINT

CROSS-REFERENCES TO RELATED APPLICATIONS

This application claims the benefit of U.S. provisional application Ser. No. 62/072,757 filed Oct. 30, 2014, the disclosures of which is hereby incorporated in their entirety by reference herein.

BACKGROUND OF THE INVENTION

The present disclosure relates to a tripot constant velocity joint.

Constant velocity joints are widely used for the transmission of rotational energy. Constant velocity joints allow a drive shaft to transmit power through a variable angle, at constant rotational speed. One type of telescoping constant velocity is referred to as a tripot joint. Tripot joints are particularly useful for automotive axial drive shafts, particularly in front-wheel-drive vehicles between the transaxle differential and the driving wheel, as well as other applications. These telescoping constant velocity joint transmit a torque at various rotational speeds, joint angles and telescopic positions between shaft members.

SUMMARY OF THE INVENTION

A tripot constant velocity joint includes a housing, a spider member, and a ball set. The housing is connected to a first shaft extending along a first axis. The housing has a guide channel that includes a first sidewall, a second sidewall disposed opposite the first sidewall, and a top wall extending between the first sidewall and the second sidewall. The spider member is received within the housing and connected to a second shaft extending along a second axis. The spider member includes a trunnion having a functional outer surface with a convex profile characterized by a first principal radius of curvature and a second principal radius of curvature orthogonal to the first principal radius of curvature. The first principal radius of curvature is different from the second principal radius of curvature. The ball set disposed on the functional outer surface of the trunnion includes a first ball member, a second ball member, and a plurality of rolling elements. The first ball member having a first inner surface and a first outer surface disposed opposite the first inner surface. The first inner surface having a piecewise concave continuous profile that engages the functional outer surface of the trunnion. The second ball member having a second inner surface and a second outer surface disposed opposite the second inner surface and defined by a non-symmetric piecewise continuous profile. The non-symmetric piecewise continuous profile defined by a substantially straight portion and a convex portion adjacent to the substantially straight portion. The second outer surface engages the first sidewall. The plurality of rolling elements disposed between the first outer surface and the second inner surface . . . .

A tripot constant velocity joint including a housing, a spider member, and a ball set. The housing defining a guide channel that includes a first sidewall, a second sidewall, and a top wall. The first sidewall is provided with a concave profile defined by a first sidewall portion having a first sidewall portion radius of curvature and a second sidewall portion having a second sidewall portion radius of curvature. The second sidewall portion radius of curvature being greater than the first sidewall portion radius of curvature. The second sidewall disposed opposite the first sidewall. The top wall extending between the first sidewall and the second sidewall. The spider member is received within the housing and connected to a second shaft extending along a second axis. The spider member includes a trunnion having a functional outer surface with a convex profile defined by a first principal radius of curvature and a second principal radius of curvature orthogonal to the first principal radius of curvature. The first principal radius of curvature is different from the second principal radius of curvature. The ball set disposed on the functional outer surface of the trunnion. The ball set includes a first ball member and a second ball member. The first ball member has a first inner surface and a first outer surface disposed opposite the first inner surface. The first inner surface having a piecewise concave continuous profile that engages the functional outer surface of the trunnion. The second ball member having a second inner surface and a second outer surface disposed opposite the second inner surface and defined by a non-symmetric piecewise continuous profile. The non-symmetric piecewise continuous profile defined by a substantially straight portion and a convex portion adjacent to the substantially straight portion. The second outer surface engages the first sidewall.

A tripot constant velocity joint includes a housing, a spider member, and a first ball member. The housing includes a first sidewall, a second sidewall disposed opposite the first sidewall, and a top wall extending between the first sidewall and the second sidewall defining a guide channel. The spider member is received within the housing and is connected to a second shaft extending along a second axis. The spider member including a trunnion having a functional outer surface with a convex profile defined by a first principal radius of curvature and a second principal radius of curvature orthogonal to the first principal radius of curvature. The first principal radius of curvature is different from the second principal radius of curvature. The first ball member has a first inner surface and a first outer surface disposed opposite the first inner surface. The first inner surface engages the functional outer surface of the trunnion and is provided with a symmetric piecewise continuous substantially cylindrical profile. The first outer surface provided with a non-symmetric piecewise continuous profile that engages the first sidewall. The non-symmetric piecewise continuous profile having a substantially straight portion and a convex portion.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 4 is a partial section view of the functional outer surface of the trunnion

DETAILED DESCRIPTION

Referring now to the Figures, where the invention will be described with reference to specific embodiments, without limiting same, it is to be understood that the disclosed embodiments are merely exemplary of the invention that is embodied in various and alternative forms. The figures are not necessarily to scale; some features are exaggerated or minimized to show details of particular components. Therefore, specific structural and functional details disclosed herein are not to be interpreted as limiting, but merely as a representative basis for teaching one skilled in the art to variously employ the present invention.

Figure 1:
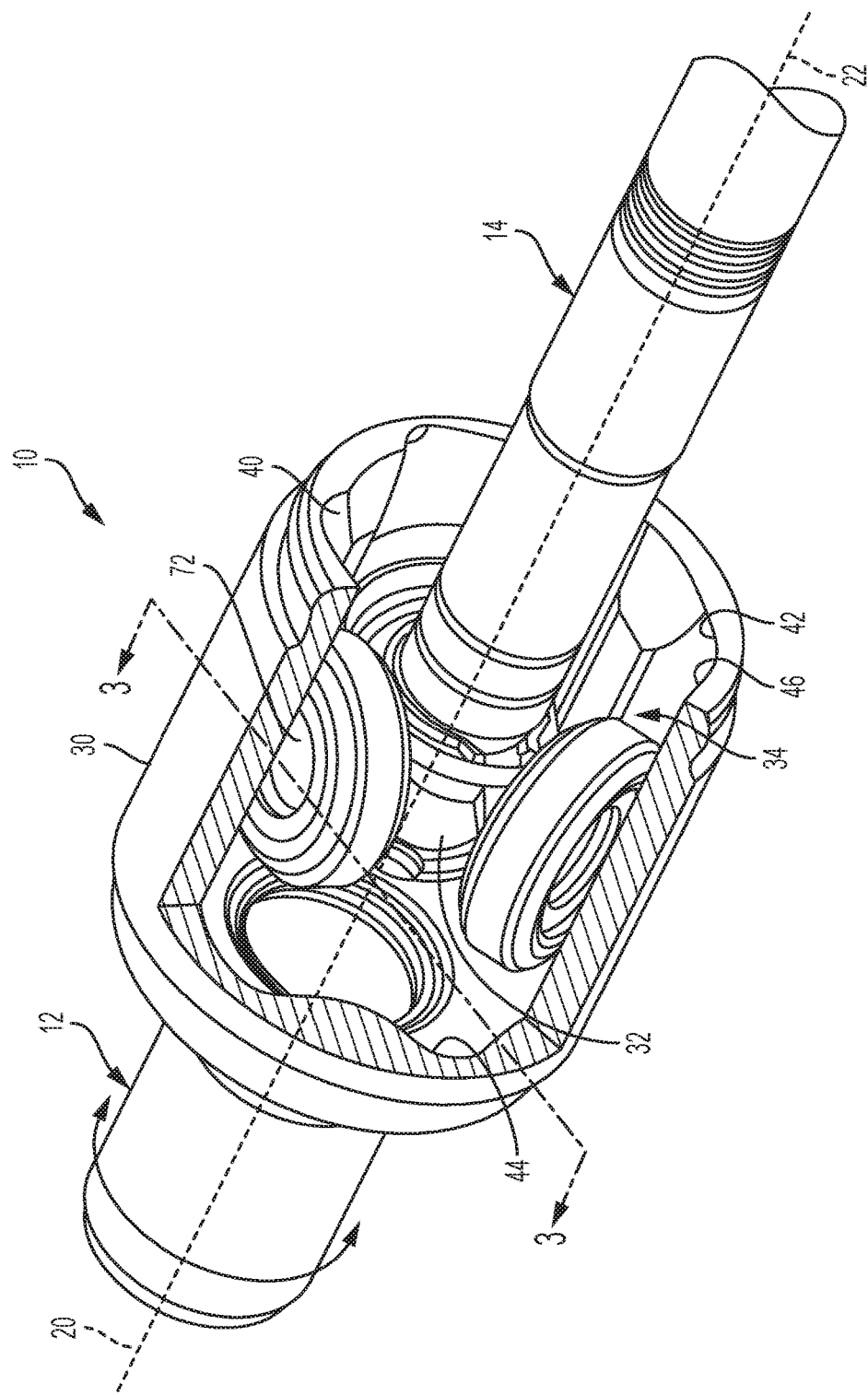
FIG. 1 is a partial perspective view of a tripot constant velocity joint.
Figure 2:
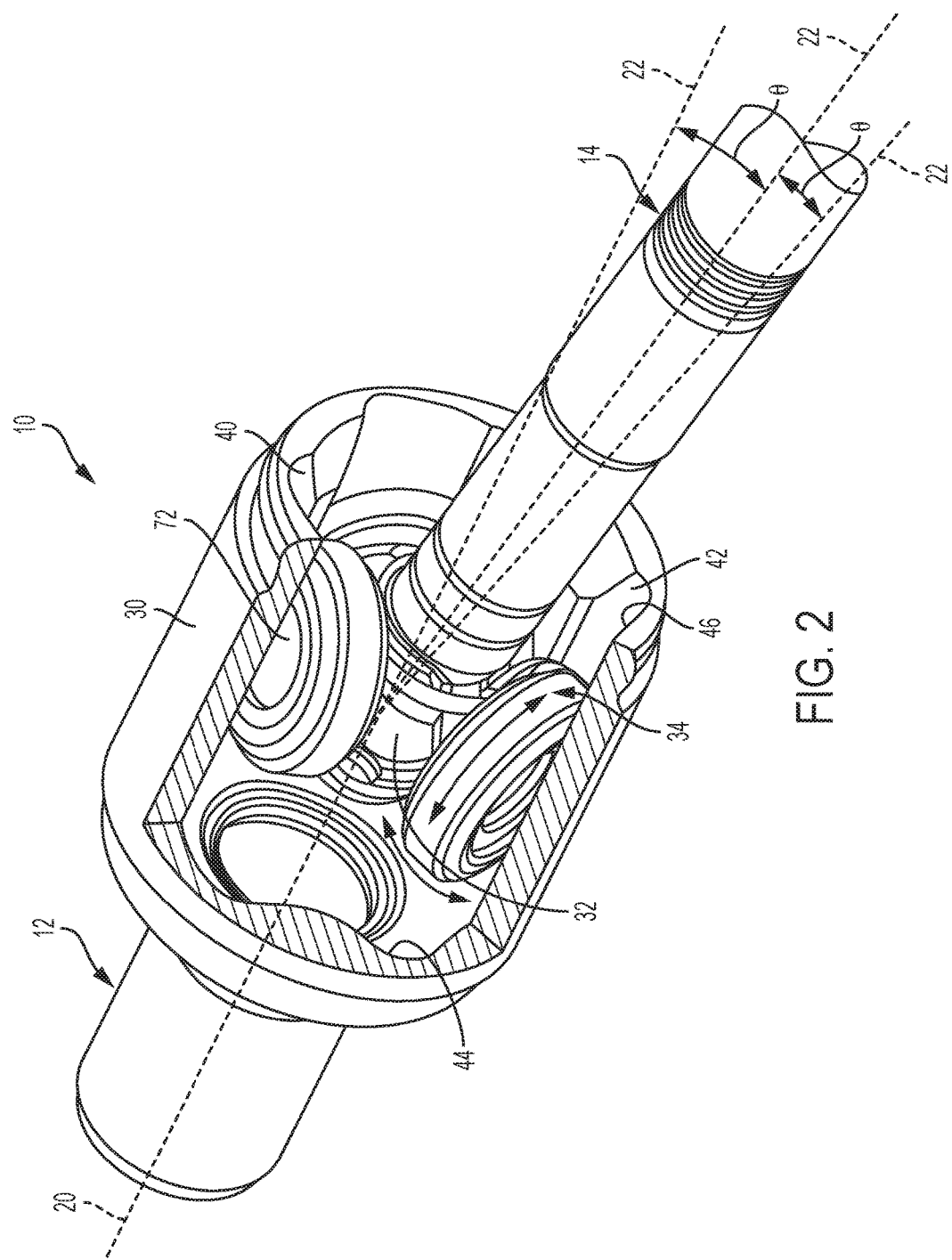
FIG. 2 is a partial perspective view of the tripot constant velocity joint illustrating the joint within a predetermined range of angular articulation.

Referring to the FIGS. 1 and 2, a constant velocity joint 10 is shown. The constant velocity joint is a telescoping constant velocity joint such as a tripod or tripot constant velocity joint. The constant velocity joint 10 is provided with a vehicle such as a truck, automobile, recreational vehicle, or cargo vehicle, or the like. Such a constant velocity joint 10 may be suitable for use in front wheel drive vehicles and is disposed between and operatively coupled to a transaxle and a driving wheel or other applications where torque is transfer between two rotatable shaft members with possible axial position or angular position changes relative to each other. The tripot constant velocity joint transmits torque between a first shaft member 12 and a second shaft member 14. The tripot constant velocity joint is configured to transmit torque from the first shaft member 12 to the second shaft member 14 through various rotational speeds, joint angles, or telescopic positions.

The first shaft member 12 extends along a first axis 20. The second shaft member 14 extends along a second axis 22. The first shaft member 12 and the second shaft member 14 are configured to articulate and/or telescope relative to each other about their respective axes. The first axis 20 and the second axis 22 coincide or are collinear when the constant velocity joint 10 is at a joint angle of 0 degrees. As shown in FIG. 2, the first axis 20 and the second axis 22 intersect when the constant velocity joint 10 is articulated or bent at an angle, i.e. when the first shaft member 12 and the second shaft member 14 are articulated relative to each other. The constant velocity joint 10 includes a housing 30, a spider 32, and a ball set 34.

The housing 30 is connected to the first shaft member 12 and extends along the first axis 20. The combination of the housing 30 and the first shaft member 12 are rotatable about the first axis 20. The housing 30 defines a plurality of ball set tracks or guide channels 40. Each guide channel 40 extends axially along and is disposed substantially parallel to the first axis 20. As shown in the Figures, the housing 30 defines three guide channels that are radially spaced apart about the first axis 20. Each guide channel 40 is equally spaced apart at 120° intervals from each other. Each guide channel 40 includes a first sidewall 42, a second sidewall 44, and a top wall 46.

The first sidewall 42 and the second sidewall 44 extend away from the first axis 20 towards the top wall 46. The second sidewall 44 is disposed opposite the first sidewall 42. The first sidewall 42 is disposed substantially parallel to but is not coplanar with the second sidewall 44. The top wall 46 extends between the first sidewall 42 and the second sidewall 44. The top wall 46 is disposed substantially perpendicular to both of the first sidewall 42 and the second sidewall 44. The top wall 46 is disposed substantially parallel to the first axis 20. The top wall 46 is disposed further from the first axis 20 than the first sidewall 42 and the second sidewall 44.

The first sidewall 42 and the second sidewall 44 each have a generally concave profile when viewed in a cross-section transverse to the first axis 20. The generally concave profile will be described with reference to the first sidewall 42 however the second sidewall 44 may also have a similar but mirrored or diametrically opposed configuration. The first sidewall 42 is a piecewise continuous surface that defines the generally piecewise concave continuous profile. The generally piecewise concave continuous profile of the first sidewall 42 is defined by a first sidewall portion 50, a second sidewall portion 52, and a third sidewall portion 54.

The first sidewall portion 50 is disposed adjacent to and between the top wall 46 and the second sidewall portion 52. The first sidewall portion 50 has a first sidewall portion radius of curvature, rs1. A transition region 56 extends between the first sidewall portion 50 and the second sidewall portion 52. The transition region 56 provides a substantially smooth or continuous transition between the first sidewall portion 50 and the second sidewall portion 52. The second sidewall portion 52 is disposed between the first sidewall portion 50 and the third sidewall portion 54. The second sidewall portion 52 has a second sidewall portion radius of curvature, rs2. The third sidewall portion 54 is disposed adjacent to the second sidewall portion 52. The third sidewall portion 54 has a third sidewall portion radius of curvature, rs3.

The second sidewall portion radius of curvature, rs2 has infinite large radius of curvature, larger than the first sidewall portion radius of curvature, rs1, such that the second sidewall portion 52 is a substantially straight portion. The substantially straight portion tapers towards the trunnion axis 76 or an axis of the ball set 34 such that the second sidewall portion 52 is inclined or declined with respect to the trunnion axis 76 or an axis of the ball set 34.

The first sidewall portion radius of curvature, rs1, and the third sidewall portion radius of curvature, rs3, defines the generally concave profile of the first sidewall 42. An absolute value of a ratio between the third sidewall portion radius of curvature, rs3, and the first sidewall portion radius of curvature, rs1, may be greater or less than one.

The top wall 46 includes a protrusion 60 extending along a face of the top wall 46. The protrusion 60 extends substantially parallel to the first axis 20 and extends towards the first axis 20.The protrusion 60 extends towards the second axis 22 and extends towards the spider 32. The protrusion 60 defines a center guide disposed substantially equidistant from the first sidewall 42 and the second sidewall 44.

The spider 32 is connected to the second shaft member 14 via a splined bore for an engagement with splines on the second shaft member 14. The spider 32 is received within the housing 30. The spider 32 and the second shaft member 14 is configured to move relative to the housing 30 and the first shaft member 12. The spider 32 and the second shaft member 14 are configured to articulate relative to the housing 30 and the first shaft member 12 such that the second axis 22 is disposed at an angle with respect to the first axis 20. The spider 32 includes a plurality of spider members 70 extending away from the splined bore, configured as protrusions. As shown in the Figures, the spider 32 defines three spider members that are radially spaced apart about the second axis 22. Each spider member is equally spaced apart at 120° intervals from each other and corresponds to a guide channel. Each spider member of the plurality of spider members 70 is configured as a trunnion 72 having a trunnion end surface 74 disposed proximate the protrusion 60.

The trunnion 72 extends along a trunnion axis 76 away from the second axis 22. The trunnion axis 76 is disposed substantially perpendicular to the second axis 22. The trunnion 72 has a functional outer surface 80 that transmits torque or force that is adjacent to a non-functional outer surface 81 of the trunnion 72 that does not transmit torque or force. The functional outer surface 80 has a non-cylindrical profile. The functional outer surface 80 has a convex profile that is concentric with the trunnion axis 76, such that it is a convex outer surface. The convex profile is a truncated toroid or interrupted toroid and is described by a radial arc or radius of curvature that is rotated about a centroid.

The convex profile is characterized by a first principal radius of curvature, rt1, and a second principal radius of curvature, rt2. The first principal radius of curvature, rt1, corresponds to a first line segment 82. The second principal radius of curvature, rt2, corresponds to a second line segment 84. The first line segment disposed transverse to the second line segment 84. The second principal radius of curvature, rt2, extends from the second line segment 84 that is disposed within an equatorial plane 86. functional outer surface 80

Referring to FIGS. 3-5C, the first principal radius of curvature, rt1, of the functional outer surface 80 is disposed on the first line segment 82 that is formed by the intersection of the functional outer surface 80 and a transverse plane 85 disposed parallel to the trunnion axis 76. The second principal radius of curvature, rt2, of the functional outer surface 80 is disposed on the second line segment 84 formed by the intersection of the functional outer surface 80 and an equatorial plane 86 disposed perpendicular to trunnion axis 76. The first line segment 82 and the second line segment 84 intersect at a single common point, The second principal radius of curvature, rt2, is disposed orthogonal to or perpendicular to the first principal radius of curvature, rt1. The first principal radius of curvature, rt1, may be less than the second principal radius of curvature, rt2. The first principal radius of curvature, rt1, is varying along the first line segment 82 at a rate of change similar but not limited to a parabolic, elliptic, polynomial or hyperbolic shape. The first principal radius of curvature, rt1, decreases in a direction that extends away from the equatorial plane 86. The decreasing of the first principal radius of curvature, rt1, in a direction that extends away from the equatorial plane 86 such that the functional outer surface 80 falls or angles towards the trunnion axis 76.

In at least one embodiment, the second principal radius of curvature, rt2, varies along the second line segment 84 at a rate of change similar but not limited to a parabolic, elliptic, polynomial or hyperbolic shape.

An absolute value of a ratio between the first principal radius of curvature, rt1, and the second principal radius of curvature, rt2, is less than one. In at least one embodiment, the first principal radius of curvature, rt1, is greater than the second principal radius of curvature, rt2, corresponding to an ellipsoid shape. An absolute value of a ratio between the first principal radius of curvature, rt1, and the second principal radius of curvature, rt2, is greater than one. The ratio between the first principal radius of curvature, rt1, and the second principal radius of curvature, rt2, not being equal to one may ensure that the functional outer surface 80 does not have a spherical profile.

Figure 3:
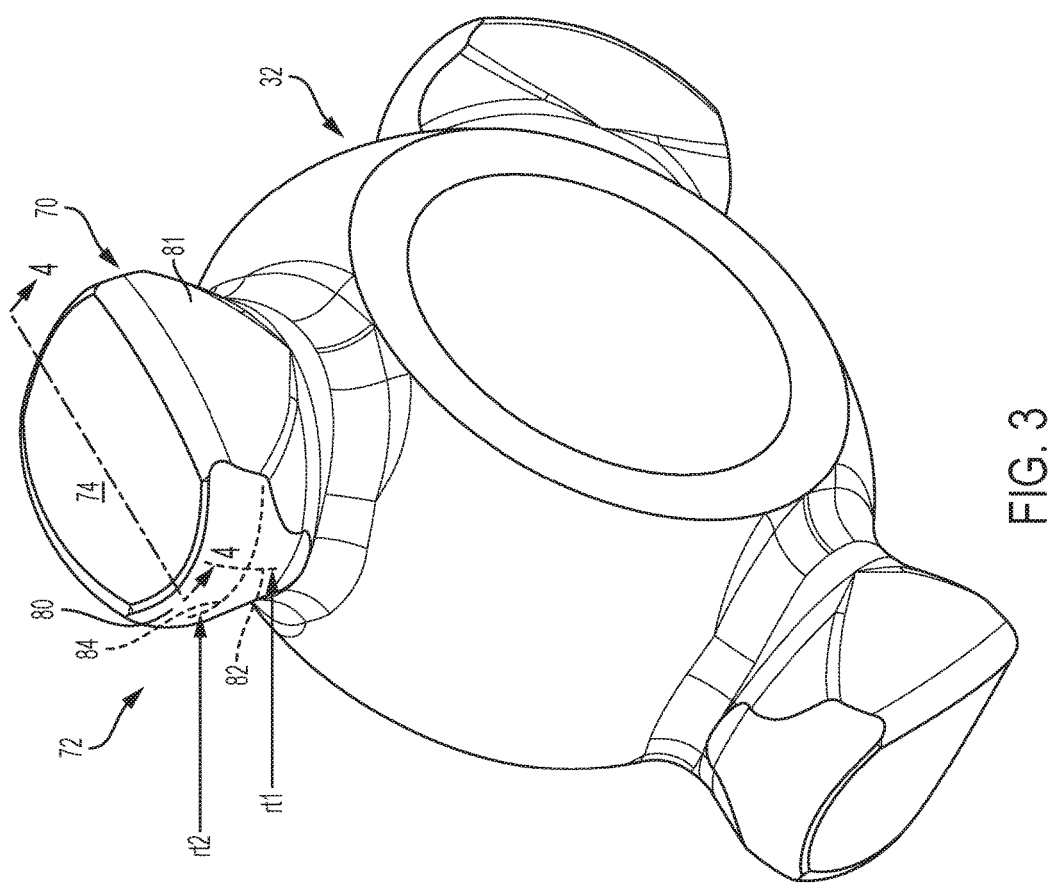
FIG. 3 is an isometric view of the spider.

Referring to FIGS. 3 and 4, the functional outer surface 80 of the trunnion 72 will be more specifically described. The functional outer surface 80 is a trunnion contact surface that contacts a member of the ball set 34, with at least one contact point. The functional outer surface 80 has a convex profile that provides a toroid-like non-spherical surface. The first principal radius of curvature, rt1, is disposed on the first line segment 82 that is angularly disposed with respect to the second line segment 84. In the embodiment shown the first line segment 82 is disposed transverse to or orthogonal to the second line segment 84. The first line segment 82 is disposed within the transverse plane 85. The second principal radius of curvature, rt2, is disposed on the second line segment 84 that is disposed within the equatorial plane 86. The first line segment 82 is swept or revolved about an axis transverse or orthogonal to the trunnion axis 76. The second line segment 84 may be an axis or equator of the toroid like non-spherical surface that is swept or revolved about the trunnion axis 76.

The functional outer surface 80 is characterized by the first principal radius of curvature, rt1, and the second principal radius of curvature, rt2. The first principal radius of curvature, rt1, is continuously varying such that the first principal radius of curvature, rt1, decreases in a direction that extends away from the equatorial plane 86. The first principal radius of curvature, rt1, progressively decreases in a direction that extends away from the equatorial plane 86 towards the trunnion end surface 74. The first principal radius of curvature, rt1, progressively decreases in a direction that extends away from the equatorial plane 86 and away from the trunnion end surface 74. The decreasing first principal radius of curvature, rt1, in a direction that extends away from the equatorial plane 86 results in the functional outer surface 80 falling or angling towards the trunnion axis 76. A linear distance between a point on the functional outer surface 80 and the trunnion axis 76 decreases in a direction that extends away from the equatorial plane 86. In other words, a linear distance between a point on the functional outer surface 80 and a point of an adjoining component, such as a member of the ball set 34, progressively increases in a direction that extends away from the equatorial plane 86.

Figure 5A:
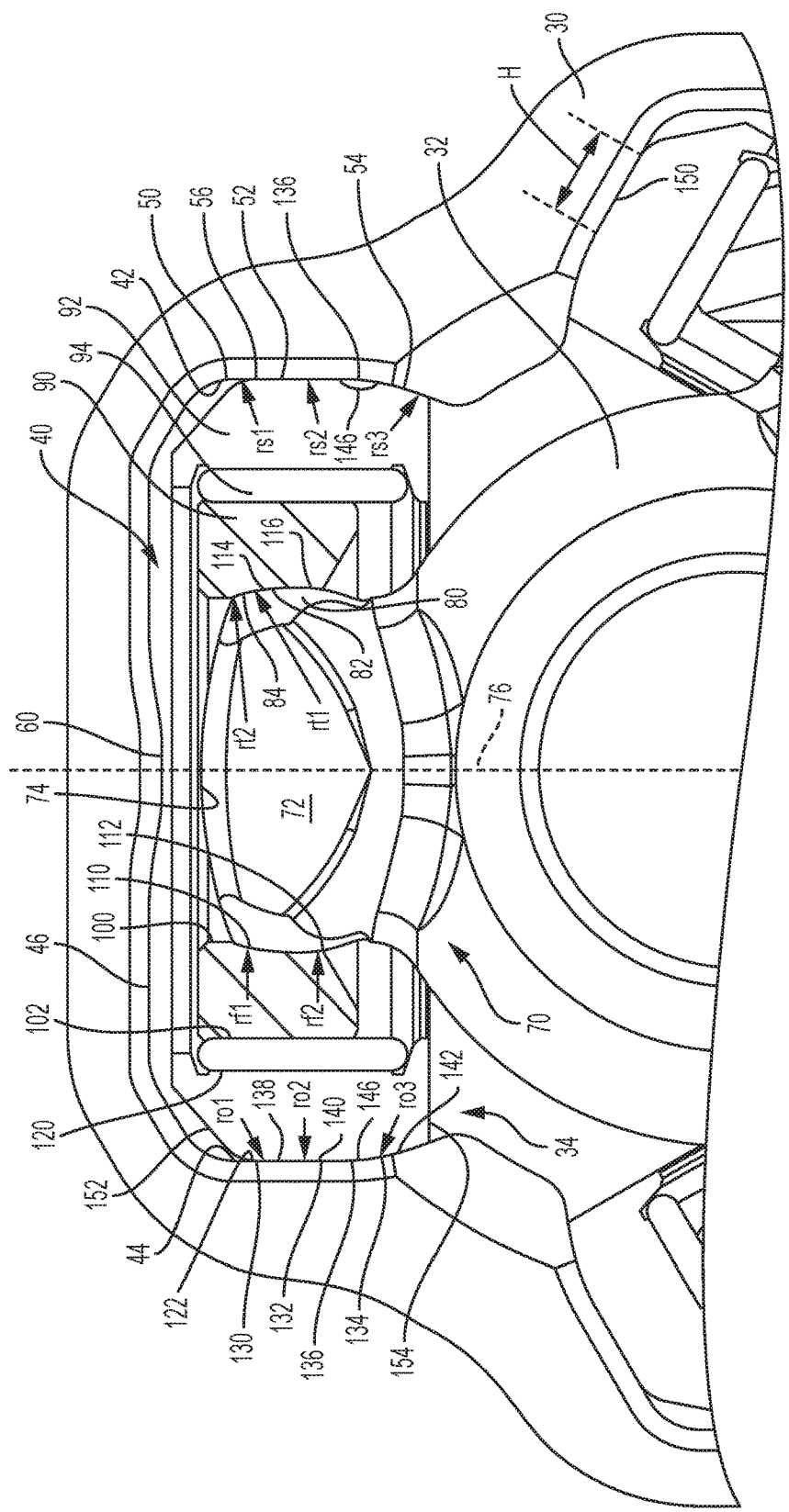
FIG. 5A is a cross-sectional view along section 3-3 of FIG. 1 of a first embodiment of the tripot constant velocity joint.
Figure 5B:
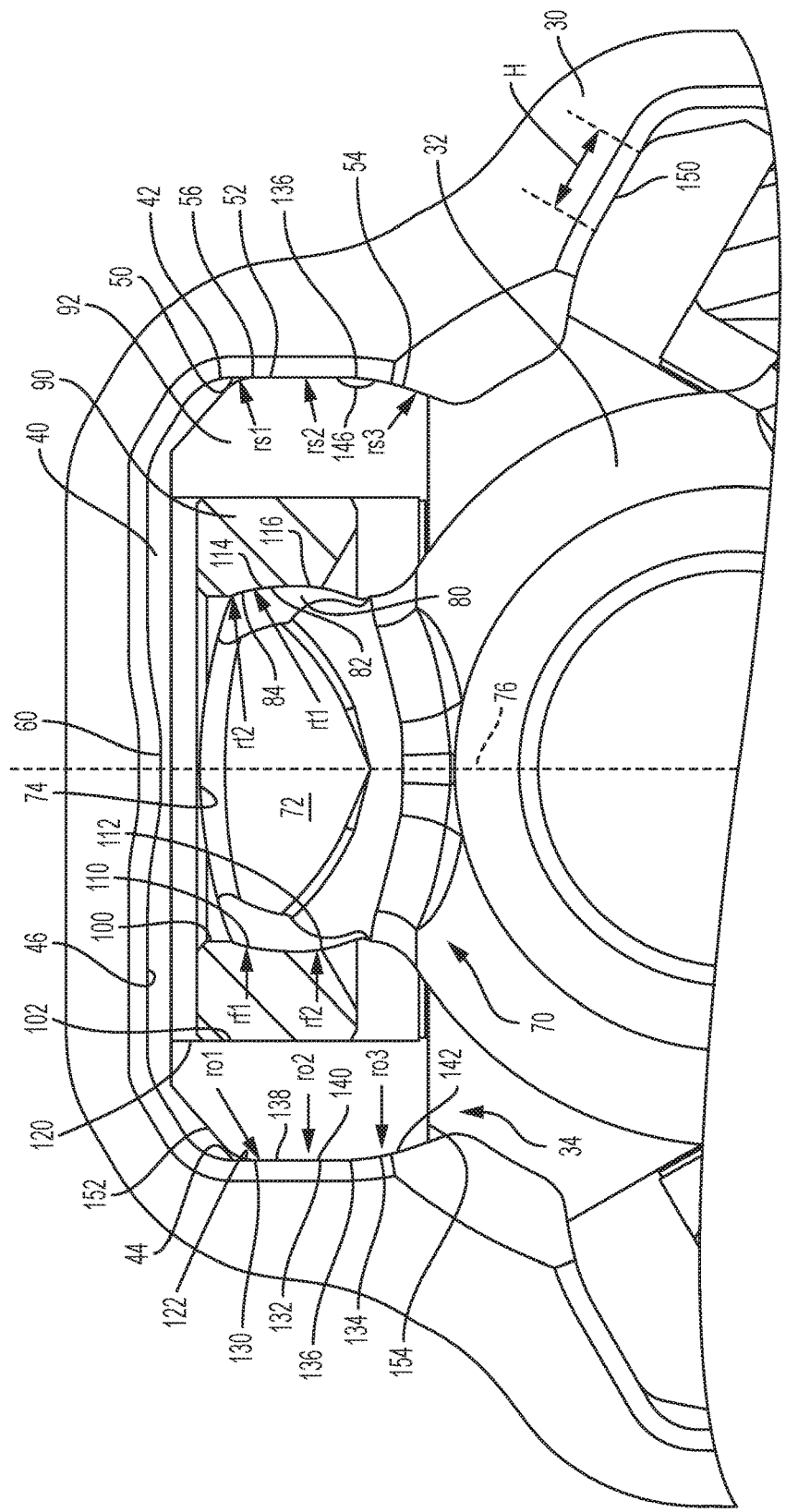
FIG. 5B is a cross-sectional view along section 3-3 of FIG. 1 of a second embodiment of the tripot constant velocity joint.

Referring to FIGS. 5A-5B, the ball set 34 is disposed on the functional outer surface 80 of the trunnion 72. The trunnion 72 rotatably support the ball set 34. As shown in the Figures, three ball assemblies are provided and disposed on respective trunnions. The ball set 34 is disposed on a trunnion 72 and is slidably or rollingly received within their respective guide channel 40. The ball set 34 includes a first ball member 90, a second ball member 92, and a plurality of rolling elements 94.

The first ball member 90 has a first inner surface 100 and a first outer surface 102. The first inner surface 100 is a piecewise continuous surface having a concave profile that engages the functional outer surface 80 of the trunnion 72 having a convex profile. The first inner surface 100 has a surface texture that meets an Rsk value of less than zero. The concave profile of the first inner surface 100 is defined by a first ball member first portion 110 and a first ball member second portion 112. The concave profile of the first inner surface 100 may include a truncated toroid, truncated ellipsoid, truncated spheroid, a piecewise continuous profile revolved around the trunnion axis 76 or a combination thereof.

The first ball member first portion 110 is disposed adjacent to the first ball member second portion 112. The first ball member first portion 110 engages the functional outer surface 80 of the trunnion defining a first ball-trunnion contact patch 114. The first ball member first portion 110 has a first principal radius of curvature, rf1. The first ball member second portion 112 also engages the functional outer surface 80 of the trunnion defining a second ball-trunnion contact patch 116. The first ball member second portion 112 has a second principal radius of curvature, rf2. The second principal radius of curvature, rf2, is different from the first principal radius of curvature, rf1. A ratio of the first principal radius of curvature, rf1, and the second principal radius of curvature, rf2, is less than one. In at least one embodiment, a ratio of the first principal radius of curvature, rf1, and the second principal radius of curvature, rf2, is greater than one.

Should the first principal radius of curvature, rf1, of the first ball member first portion 110 be larger than the first principal radius of curvature, rt1, of the first line segment 82 there is a single point of contact at the first ball-trunnion contact patch 114. The single point of contact at the first ball-trunnion contact patch 114 reduces friction between the trunnion 72 and the ball set 34 via the first ball member 90. The reduction in friction improves noise, vibration, harshness (NVH) performance of the vehicle, such as vehicle shudder.

The first outer surface 102 is disposed opposite the first inner surface 100. The first outer surface 102 may be a crowned or substantially straight surface up to an including a straight portion that engages a rolling element of the plurality of rolling elements 94. The substantially straight surface up to and including a straight portion that tapers towards the trunnion axis 76 or an axis of the ball set 34 such that the first outer surface 102 is inclined or declined with respect to the trunnion axis 76 or an axis of the ball set 34. The first outer surface 102 has a surface texture that meets an Rsk value of less than zero.

The second ball member 92 has a second inner surface 120 and a second outer surface 122. The second inner surface 120 is disposed opposite the second outer surface 122. The second inner surface 120 may be a crowned or substantially straight surface up to an including a straight portion that engages a rolling element of the plurality of rolling elements 94. The second inner surface 120 has a surface texture that meets an Rsk value of less than zero.

A pair of thrust shoulders (or a flange) is disposed at opposite ends of the second inner surface of 120. The pair of thrust shoulders project radially inward from the second inner surface 120 towards the trunnion axis 76. The pair of thrust shoulders aid in axially retaining a rolling element of the plurality of rolling elements 94.

The second outer surface 122 is a non-symmetric piecewise continuous surface having a convex radius of curvature or a non-symmetric piecewise continuous profile (convex profile) that engages the first sidewall 42 of the guide channel 40 having a concave profile. The second outer surface 122 may be a crowned or substantially straight surface up to an including a straight portion that engages a rolling element of the plurality of rolling elements 94. The substantially straight surface up to and including a straight portion that tapers towards the trunnion axis 76 such that the second outer surface 122 is inclined or declined with respect to the trunnion axis 76 or an axis of the ball set 34. The second outer surface 122 has a surface texture that meets an Rsk value of less than zero. The convex profile of the second outer surface 122 is defined by a second outer surface first portion 130, a second outer surface second portion 132, and a second outer surface third portion 134. The convex profile of the second outer surface 122 may include a truncated toroid, truncated ellipsoid, truncated sphere, a piecewise continuous profile revolved around the trunnion axis 76 or a combination thereof.

The second outer surface first portion 130 is disposed adjacent to and between a top surface of the second ball member 92 and the second outer surface second portion 132. The second outer surface first portion 130 has a second outer surface first portion radius of curvature, ro1. A ball transition region 136 extends between the second outer surface first portion 130 and the second outer surface second portion 132. The ball transition region 136 provides a substantially smooth or continuous transition between the second outer surface first portion 130 and the second outer surface second portion 132. The second outer surface second portion 132 is disposed between the second outer surface first portion 130 and the second outer surface third portion 134. The second outer surface second portion 132 has a second outer surface second portion 132 radius of curvature, ro2. The second outer surface third portion 134 is disposed adjacent to and between the second outer surface second portion 132 and a bottom surface of the second ball member 92. The second outer surface third portion 134 has a second outer surface third portion radius of curvature, ro3.

The second outer surface second portion radius of curvature, ro2 has a large radius of curvature, such that the second outer surface second portion 132 is a substantially straight portion. The second outer surface first portion radius of curvature, ro1, and the second outer surface third portion radius of curvature, ro3, substantially defines the generally convex profile of the second outer surface 122. An absolute value of a ratio between the second outer surface third portion radius of curvature, ro3, and the first outer surface second portion radius of curvature, ro1, may be greater or less than one.

The second outer surface first portion 130 is disposed proximate the first sidewall portion 50. The second outer surface second portion 132 is disposed proximate the second sidewall portion 52. The second outer surface second portion 132 engages the second sidewall portion 52. The engagement between the second outer surface second portion 132 and the second sidewall portion 52 defines a second ball-sidewall contact patch 140. The second outer surface third portion 134 is disposed proximate the third sidewall portion 54. The second outer surface third portion 134 engages the third sidewall portion 54. The engagement between the second outer surface third portion 134 and the third sidewall portion 54 defines a third ball-sidewall contact patch 142.

Should the second outer surface first portion radius of curvature, ro1 of the second outer surface first portion 130 be less than the first sidewall portion radius of curvature, rs1, of the first sidewall 42, there is a clearance condition proximate the ball transition region 138.

Should the second outer surface second portion radius of curvature, ro2, of the second outer surface second portion 132 be less than the second sidewall portion radius of curvature, rs2, of the second sidewall portion 52, there is a clearance condition at the ball transition region 136. The single point of contact at the second ball-sidewall contact patch 140 further reduces friction between the guide channel 40 and the ball set 34 via the second ball member 92. The reduction in friction improves NVH performance of the vehicle during events in which the ball set 34 rotates about or translates axially along the trunnion axis 76.

The second outer surface 122 is spaced apart from the first sidewall 42 proximate the transition region 56 of the first sidewall 42 and the ball transition region 136 of the second outer surface 122. In at least one embodiment, an undercut 146 is added to the second outer surface 122 to ensure that the second outer surface 122 is spaced apart from the first sidewall 42 proximate the transition region 56 and the ball transition region 136. The undercut 146 is sized such that the amount of clearance between the second outer surface 122 and the first sidewall 42 exceeds an amount of elastic deformation of at least one of a ball set 34 component or a housing 30 component proximate the transition regions when the constant velocity joint 10 is under design torques. The second outer surface third portion 134 is spaced apart from the third sidewall portion 54 such that the third sidewall portion 54 does not engage the second outer surface third portion 134. The second outer surface third portion 134 is spaced apart from the third sidewall portion 54

In at least one embodiment, the second outer surface 122 includes a cylindrical section 150. The cylindrical section 150 is disposed between a top surface of the second ball member 152 and a bottom surface of the second ball member 154. The top surface of the second ball member 152 is a non-cylindrical portion. The bottom surface of the second ball member 154 is a non-cylindrical portion. The cylindrical section 150 minimum height, H, is satisfied by the following equation:

$$H > BCD*(1-\cos(\theta)) \quad \text{Equation (1)}$$

In Equation (1) BCD is a ball circle diameter of the spider 32 and theta is a maximum tripot constant velocity joint angle. The housing 30 has a ball circle diameter. Should the ball circle diameter of the spider 32 but substantially co linear with the ball circle diameter of the housing, loading of the tripot constant velocity joint is through the center of the ball set 34. The combination of the radii of first sidewall portion radius of curvature, rs1, the second sidewall portion radius of curvature, rs2, the third sidewall portion radius of curvature, rs3; the radii of second outer surface first portion radius of curvature, ro1, the second outer surface second portion radius of curvature, ro2, the second outer surface third portion radius of curvature, ro3; the first principal radius of curvature, rt1, the second principal radius of curvature, rt2; or the first ball member first portion radius of curvature, rf1, and the first ball member second portion radius of curvature, rf2, permits the tripot constant velocity joint 10 to be less sensitive or more robust to variations or offsets between the housing ball circle diameter and the spider ball circle diameter due to manufacturing variances such that loading may be through the center of the ball set 34.

The plurality of rolling elements 94 is disposed between the first outer surface 102 and the second inner surface 120. The plurality of rolling elements 94 may be balls, cones, rollers, needles, or the like.

Should the first shaft member 12 and the housing 30 and or the second shaft member 14 and the spider 32 be articulated to a joint angle greater than an articulation threshold, i.e. an over articulation condition, at least a portion of the ball set 34 engages the protrusion 60 and the first ball member 90 detaches from the trunnion 72. Upon the first shaft member 12 and the housing 30 and or the second shaft member 14 and the spider 32 return from the over articulation condition and be articulated to a joint angle within the articulation threshold, the first ball member 90 engage the protrusion 60 such that the first ball member 90 (the ball set 34) reattaches to the trunnion 72 should the first ball member 90 become detached from the trunnion 72. The protrusion 60 also inhibits tipping of the ball set 34 due to articulation of the constant velocity joint 10 proximate or greater than the articulation threshold.

Figure 5C:
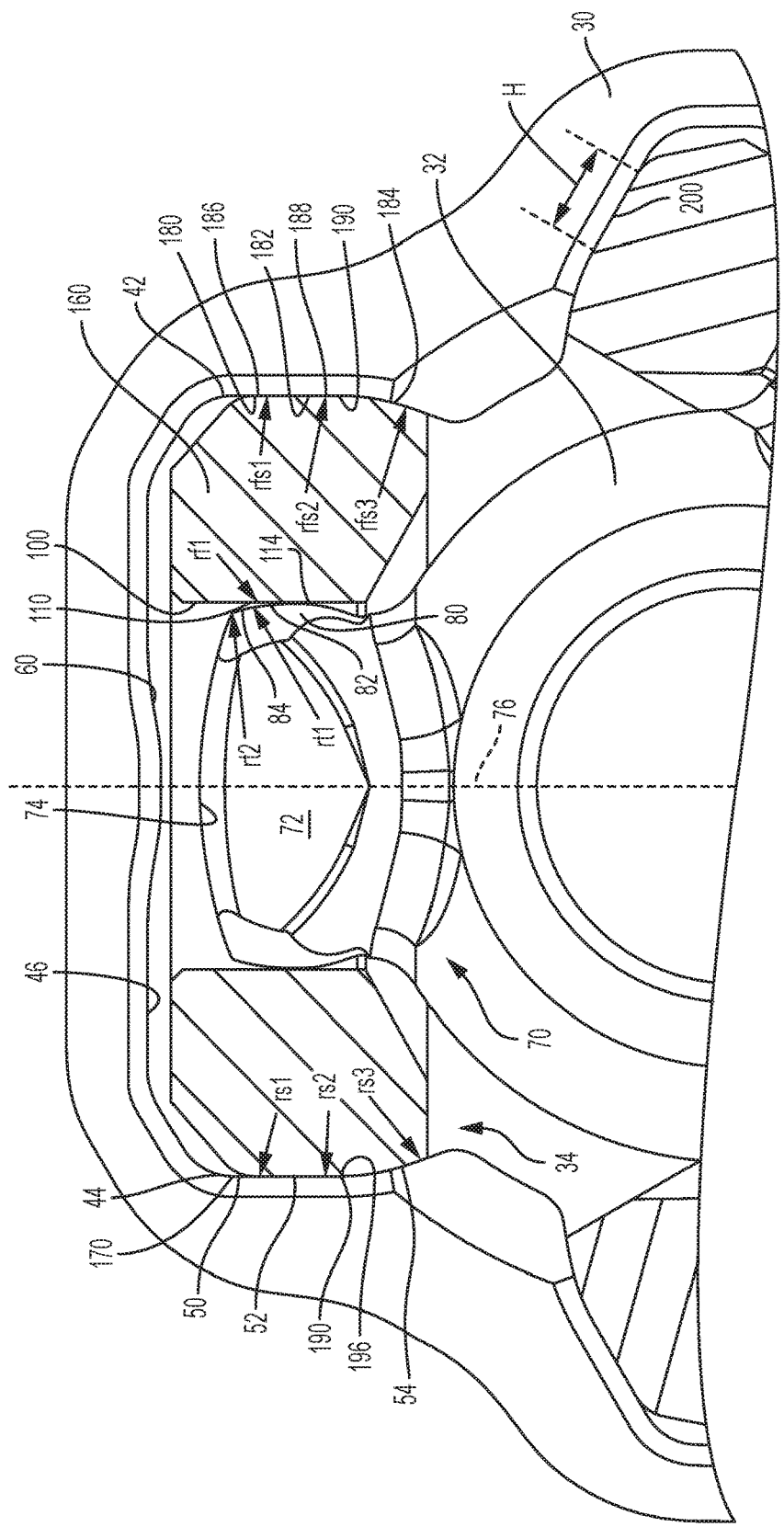
FIG. 5C is a cross-sectional view along section 3-3 of FIG. 1 of a third embodiment of the tripot constant velocity joint.

As shown in FIG. 5C the plurality of rolling elements number of 94 are not be provided. In such an embodiment, the first outer surface 102 is disposed proximate and engage the second inner surface 120. Referring to FIG. 5C, an exemplary constant velocity joint 10 is shown. The constant velocity joint 10 includes a housing 30, a spider 32, and a ball set 34, unlike previous embodiments the ball set 34 may not include a second ball member 92 or a plurality of rolling elements 94. The housing 30 has a first sidewall concave portion, a second sidewall straight portion, and a third sidewall concave portion. A ratio between the radii of curvature of the second sidewall straight portion and at least one of the first sidewall concave portion and the third sidewall concave portion is greater than one.

The ball set 34 includes a first ball member 160 having a first inner surface 100 and a first outer surface 170. The first inner surface 100 may be a crowned surface having a substantially straight portion and a crowned or convex portion adjacent to the substantially straight portion. The first inner surface 100 engages the first line segment 82. The engagement between the first ball member first portion 110 and the first line segment 82 defines a first ball-trunnion contact patch 114. The first ball member first portion 110 has a first principal radius of curvature, rf1.

The first outer surface 170 is a non-symmetric piecewise continuous surface having a convex profile that engages the first sidewall 42 of the guide channel 40 having a concave profile. The first outer surface 170 has a surface texture that meets an Rsk value of less than zero. The convex profile of the first outer surface 170 is defined by a first outer surface first segment 180, a first outer surface second segment 182, and a first outer surface third segment 184. The convex profile of the first outer surface 170 may include a truncated toroid, truncated ellipsoid, truncated spheroid or a combination thereof.

The first outer surface first segment 180 is disposed adjacent to and between a top surface of the first ball member 160 and the first outer surface second segment 182. The first outer surface first segment 180 has a first outer surface first segment radius of curvature, rfs1. A ball transition region 190 extends between the first outer surface first segment 180 and the first outer surface second segment 182. The ball transition region 190 provides a substantially smooth or continuous transition between the first outer surface first segment 180 and the first outer surface second segment 182. The first outer surface second segment 182 is disposed between the first outer surface first segment 180 and the first outer surface third segment 184. The first outer surface second segment 182 has a first outer surface second segment radius of curvature, rfs2. The first outer surface third segment 184 is disposed adjacent to and between the first outer surface second segment 182 and a bottom surface of the first ball member 160. The first outer surface third segment 184 has a first outer surface third segment radius of curvature, rfs3.

The first outer surface first segment radius of curvature, rfs1 has an infinite radius of curvature. The first outer surface second segment radius of curvature, rfs2, and the first outer surface third segment radius of curvature, rfs3, substantially defines the generally convex profile of the first outer surface 170. The first outer surface third segment radius of curvature, rfs3, is greater than the first outer surface second segment radius of curvature, rfs2. An absolute value of a ratio between the first outer surface third segment radius of curvature, rfs3, and the first outer surface second segment radius of curvature, rfs2, may be greater than one.

The first outer surface first segment 180 is disposed proximate the first sidewall portion 50. The first outer surface first segment 180 engages the first sidewall portion 50. The engagement between the first outer surface first segment 180 and the first sidewall portion 50 defines a first contact region 186. The first outer surface second segment 182 is disposed proximate the second sidewall portion 52. The first outer surface second segment 182 engages the second sidewall portion 52. The engagement between the first outer surface second segment 182 and the second sidewall portion 52 defines a second contact region 188. The first outer surface third segment 184 is disposed proximate the third sidewall portion 54. The first outer surface third segment 184 is spaced apart from and does not engage the third sidewall portion 54.

Should the first outer surface first segment radius of curvature, rfs1 of the first outer surface first segment 180 be less than the first sidewall portion radius of curvature, rs1, of the first sidewall 42, there is a single point of contact at the first contact region 186. The single point of contact at the first contact region 186 reduces friction between the guide channel 40 and the ball set 34 via the first ball member 160. The reduction in friction improves NVH performance of the vehicle during events in which the ball set 34 rotates about or translates axially along the trunnion axis 76.

Should the first outer surface second segment radius of curvature, rfs2, of the first outer surface second segment 182 be less than the second sidewall portion radius of curvature, rs2, of the second sidewall portion 52, there is a single point of contact at the second contact region 188. The single point of contact at the second contact region 188 further reduces friction between the guide channel 40 and the ball set 34 via the first ball member 160. The reduction in friction improves NVH performance of the vehicle during events in which the ball set 34 rotates about or translates axially along the trunnion axis 76.

The first outer surface 170 is spaced apart from the first sidewall 42 proximate the transition region 56 of the first sidewall 42 and the ball transition region 190 of the first outer surface 170. In at least one embodiment, an undercut 196 is added to the first outer surface 170 to ensure that the first outer surface 170 is spaced apart from the first sidewall 42 proximate the transition region 56 and the ball transition region 190. The undercut 196 is sized such that the amount of clearance between the first outer surface 170 and the first sidewall 42 exceeds an amount of elastic deformation of at least one of a ball set 34 component or a housing 30 component proximate the transition regions when the constant velocity joint 10 is under design torques. The first outer surface third segment 184 is spaced apart from the third sidewall portion 54 such that the third sidewall portion 54 does not engage the first outer surface third segment 184. The first outer surface third segment 184 is spaced apart from the third sidewall portion 54

In at least one embodiment, the first outer surface third segment 184 includes a cylindrical section 200. The cylindrical section 200 is disposed between a top surface 172 of the first ball member 160 and a bottom surface 174 of the first ball member 160. The top surface 172 of the first ball member 160 is a non-cylindrical portion. The bottom surface 174 of the first ball member 160 is a non-cylindrical portion. The cylindrical section 200 has a minimum height, H, that is satisfied by Equation (1).

A lubricant may be applied to the constant velocity joint 10. The lubricant aids in reducing friction or improve NVH response of the constant velocity joint 10. The overall coefficient of friction of the tripot constant velocity joint 10 as a result of the lubricant is less than 0.1. The lubricant may contain no solid additives to further reduce friction between components of the constant velocity joint 10. In at least one embodiment, the lubricant contains molybdenum based solid additives with the median particle size between 0.5-100 microns.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A tripot constant velocity joint, comprising:
a housing connected to a first shaft extending along a first axis, the housing having a plurality of guide channels that each include a first sidewall, a second sidewall, and a top wall extending between the first sidewall and the second sidewall, the first sidewall includes a first sidewall portion, a third sidewall portion, and a second sidewall portion that is substantially straight and is disposed between the first sidewall portion and the third sidewall portion; and
a spider member, received within the housing and connected to a second shaft extending along a second axis, the spider member including a plurality of trunnions, each trunnion having a functional outer surface having a non-cylindrical, convex profile characterized by a first principal radius of curvature and a second principal radius of curvature orthogonal to the first principal radius of curvature, the first principal radius of curvature is different from the second principal radius of curvature and the first principal radius of curvature progressively decreases along a first line segment in a direction that extends away from an equatorial plane, which is disposed perpendicular to a trunnion axis along which a trunnion of the plurality of trunnions extends and the trunnion axis is disposed perpendicular to the second axis, towards a trunnion end surface.

2. The tripot constant velocity joint of claim 1, wherein a ratio between the first principal radius of curvature and the second principal radius of curvature is less than one.

3. The tripot constant velocity joint of claim 1, wherein a ratio between the first principal radius of curvature and the second principal radius of curvature is not equal to one.

4. The tripot constant velocity joint of claim 1, wherein the second principal radius of curvature progressively decreases along a second line segment in a direction that extends away from a transverse plane, which is disposed parallel to a trunnion axis along which a trunnion of the plurality of trunnions extends and the trunnion axis is disposed perpendicular to the second axis.

5. A tripot constant velocity joint, comprising:
a housing connected to a first shaft extending along a first axis, the housing having a plurality of guide channels that each include a first sidewall, a second sidewall, and a top wall extending between the first sidewall and the second sidewall, the first sidewall includes a first sidewall portion, a third sidewall portion, and a second sidewall portion that is substantially straight and is disposed between the first sidewall portion and the third sidewall portion;

a spider member, received within the housing and connected to a second shaft extending along a second axis, the spider member including a plurality of trunnions, each trunnion having a functional outer surface having a non-cylindrical, convex profile characterized by a first principal radius of curvature and a second principal radius of curvature orthogonal to the first principal radius of curvature, the first principal radius of curvature is different from the second principal radius of curvature; and a ball set disposed on the functional outer surface including:

a first ball member having a first inner surface and a first outer surface disposed opposite the first inner surface, the first inner surface having a piecewise concave continuous profile that engages the functional outer surface of the trunnion, a second ball member having a second inner surface and a second outer surface disposed opposite the second inner surface and defined by a non-symmetric piecewise continuous profile, the non-symmetric piecewise continuous profile defined by a substantially straight portion and a convex portion adjacent to the substantially straight portion, the second outer surface engages the first sidewall, and a plurality of rolling elements disposed between the first outer surface and the second inner surface.

6. The tripot constant velocity joint of claim 5, wherein the substantially straight portion tapers towards an axis of the ball set.

7. The tripot constant velocity joint of claim 5, wherein the first sidewall has a generally concave profile defined by the first sidewall portion having a first sidewall portion radius of curvature and the third sidewall portion having a third sidewall portion radius of curvature.

8. The tripot constant velocity joint of claim 7, wherein the second sidewall portion and the third sidewall portion engage the second outer surface and the first sidewall portion does not engage the second outer surface.

9. The tripot constant velocity joint of claim 5, wherein a ratio between the first principal radius of curvature and the second principal radius of curvature is less than one.

10. The tripot constant velocity joint of claim 5, wherein a ratio between the first principal radius of curvature and the second principal radius of curvature is not equal to one.

11. The tripot constant velocity joint of claim 5, wherein the first principal radius of curvature progressively decreases along a first line segment in a direction that extends away from an equatorial plane, which is disposed perpendicular to a trunnion axis along which a trunnion of the plurality of trunnions extends and the trunnion axis is disposed perpendicular to the second axis, towards a trunnion end surface.

12. The tripot constant velocity joint of claim 5, wherein the second principal radius of curvature progressively decreases along a second line segment in a direction that extends away from a transverse plane, which is disposed parallel to a trunnion axis along which a trunnion of the plurality of trunnions extends and the trunnion axis is disposed perpendicular to the second axis.

13. The tripot constant velocity joint of claim 7, wherein the second outer surface having an undercut proximate a ball transition region between the second sidewall portion and the third sidewall portion such that the second outer surface does not engage the first sidewall proximate the ball transition region.

14. A tripot constant velocity joint, comprising:

a housing connected to a first shaft extending along a first axis, the housing having a plurality of guide channels that each include a first sidewall, a second sidewall, and a top wall extending between the first sidewall and the second sidewall, the first sidewall includes a first sidewall portion, a third sidewall portion, and a second sidewall portion that is substantially straight and is disposed between the first sidewall portion and the third sidewall portion; and a spider member, received within the housing and connected to a second shaft extending along a second axis, the spider member including a plurality of trunnions, each trunnion having a functional outer surface having a non-cylindrical, convex profile characterized by a first principal radius of curvature and a second principal radius of curvature orthogonal to the first principal radius of curvature, the first principal radius of curvature is different from the second principal radius of curvature and the top wall includes one or more protrusions extending towards the second axis.

15. The tripot constant velocity joint of claim 14, wherein a ratio between the first principal radius of curvature and the second principal radius of curvature is less than one.

16. The tripot constant velocity joint of claim 14, wherein a ratio between the first principal radius of curvature and the second principal radius of curvature is not equal to one.

* * * * *